United States Patent
Kunitomo et al.

(10) Patent No.: US 10,683,384 B2
(45) Date of Patent: Jun. 16, 2020

(54) TWO-COMPONENT COMPOSITION

(71) Applicant: SIKA TECHNOLOGY AG, Baar (CH)

(72) Inventors: Takuya Kunitomo, Chigasaki (JP); Shoko Sakata, Chigasaki (JP); Barbara Jucker, Hiratsuka (JP)

(73) Assignee: SIKA TECHNOLOGY AG, Baar (CH)

( * ) Notice: Subject to any disclaimer, the term of this patent is extended or adjusted under 35 U.S.C. 154(b) by 30 days.

(21) Appl. No.: 15/759,882

(22) PCT Filed: Sep. 20, 2016

(86) PCT No.: PCT/EP2016/072302
§ 371 (c)(1),
(2) Date: Mar. 14, 2018

(87) PCT Pub. No.: WO2017/050762
PCT Pub. Date: Mar. 30, 2017

(65) Prior Publication Data
US 2018/0251590 A1 Sep. 6, 2018

(30) Foreign Application Priority Data
Sep. 23, 2015 (EP) .................................... 15186453

(51) Int. Cl.
| | | |
|---|---|---|
| *C08G 18/38* | (2006.01) | |
| *C08G 18/72* | (2006.01) | |
| *C08G 18/75* | (2006.01) | |
| *C08G 18/76* | (2006.01) | |
| *C08G 18/22* | (2006.01) | |
| *C08G 18/71* | (2006.01) | |
| *C08K 5/57* | (2006.01) | |
| *C08G 18/48* | (2006.01) | |
| *C08L 71/02* | (2006.01) | |
| *C08G 18/10* | (2006.01) | |
| *C08G 18/34* | (2006.01) | |
| *C08G 18/66* | (2006.01) | |
| *C08K 3/26* | (2006.01) | |
| *C08K 5/13* | (2006.01) | |
| *C08K 5/3475* | (2006.01) | |
| *C08K 7/16* | (2006.01) | |
| *C09D 175/04* | (2006.01) | |
| *C09J 175/04* | (2006.01) | |
| *C08G 65/336* | (2006.01) | |
| *C08F 230/08* | (2006.01) | |

(52) U.S. Cl.
CPC ......... *C08G 18/3893* (2013.01); *C08G 18/10* (2013.01); *C08G 18/227* (2013.01); *C08G 18/341* (2013.01); *C08G 18/4829* (2013.01); *C08G 18/4866* (2013.01); *C08G 18/6666* (2013.01); *C08G 18/6692* (2013.01); *C08G 18/718* (2013.01); *C08G 18/724* (2013.01); *C08G 18/755* (2013.01); *C08G 18/7621* (2013.01); *C08K 3/26* (2013.01); *C08K 5/13* (2013.01); *C08K 5/3475* (2013.01); *C08K 5/57* (2013.01); *C08K 7/16* (2013.01); *C08L 71/02* (2013.01); *C09D 175/04* (2013.01); *C09J 175/04* (2013.01); *C08F 230/08* (2013.01); *C08G 65/336* (2013.01); *C08K 2003/265* (2013.01)

(58) Field of Classification Search
CPC .. C08G 18/3893; C08G 18/10; C08G 18/227; C08G 18/341; C08G 18/4828; C08G 18/4866; C08G 18/6666; C08G 18/6692; C08G 18/718; C08G 18/724; C08G 18/755; C08G 18/766; C08K 3/26; C08K 5/13; C08K 5/3475; C08K 5/57; C08K 7/16; C08L 71/02; C09D 175/04; C09J 175/04
See application file for complete search history.

(56) References Cited

U.S. PATENT DOCUMENTS

| | | |
|---|---|---|
| 3,971,751 A | 7/1976 | Isayama et al. |
| 5,364,955 A | 11/1994 | Zwiener et al. |
| 6,207,766 B1 | 3/2001 | Doi et al. |
| 2012/0107626 A1 | 5/2012 | Schindler et al. |
| 2012/0174508 A1 | 7/2012 | Brooks et al. |
| 2012/0298300 A1 | 11/2012 | Oertli et al. |
| 2014/0242398 A1 | 8/2014 | Hudson et al. |
| 2015/0203729 A1 | 7/2015 | Stanjek et al. |

FOREIGN PATENT DOCUMENTS

| | | |
|---|---|---|
| EP | 0 319 896 A2 | 6/1989 |
| WO | 02/48228 A2 | 6/2002 |
| WO | 2014/198633 A1 | 12/2014 |

OTHER PUBLICATIONS

Feb. 3, 2017 Search Report issued in International Patent Application No. PCT/EP2016/072302.
Feb. 3, 2017 Written Opinion issued in International Patent Application No. PCT/EP2016/072302.
Feb. 3, 2020 Office Action issued in Chinese Patent Application No. 201680055401.4.
Mar. 26, 2020 Office Action issued in Australian Patent Application No. 2016328372.

*Primary Examiner* — Edward J Cain
(74) *Attorney, Agent, or Firm* — Oliff PLC

(57) ABSTRACT

A two-component composition is based on silane-functional polymers, especially silane-functional polymers with high reactivity. Such a composition shows long shelf life without the requirement of expensive stabilizers and is suitable to be used as a low E-modulus joint sealant offering excellent durability in high movement joints.

15 Claims, No Drawings

TWO-COMPONENT COMPOSITION

TECHNICAL FIELD

The present invention relates to a two-component curable composition based on silane-functional polymers suitable as joint sealant or adhesive, its use and the cured composition.

BACKGROUND OF THE INVENTION

Moisture-curable compositions based on silane-functional polymers are widely used as mainly elastic adhesives, sealants, or coatings. Compared to curable polyurethane compositions which in many cases are used for the same applications, such compositions based on silane-functional polymers are generally less problematic concerning health and safety issues. Sealants, adhesives, or coatings based on silane-functional polymers can be formulated both in one- or two-component compositions. One-component compositions are conveniently stored in single packing units and their curing mechanism is triggered as soon as humidity, mostly from air, gets in contact with the composition during and after application. This however requires careful formulation of the compositions, including strict drying of all components and addition of significant amounts of drying agents, in order to obtain sufficient shelf life of the products by preventing preliminary curing in the package. This often increases the production costs considerably and requires an advanced process control during production. Furthermore, if a long pot-life during application is required, such one-component compositions have to be deactivated considerably and require excessive time for proper through cure.

Two-component compositions based on silane-functional polymers try to get around these problems by providing a second component which often contains the curing catalyst. The two components are mixed immediately before application, and the water which is mixed into the composition is directly used to cure the composition in a very homogeneous way. Compared to single component compositions, the advantage of two-component compositions is typically a longer open time in combination with faster through cure, as curing does not only rely on moisture from ambient air slowly diffusing in. These two properties are easy to combine in a two-component composition which further maintains a long shelf life because the reactive components, i.e. catalyst and silane-functional polymer, are stored separately.

Depending on the application, the formulation can be adapted in order to achieve the desired final properties of the cured product. For elastic joint sealants for example, good adhesion and low E-modulus is desirable. Such a low modulus sealant is able to compensate for strong movement of the joint, e.g. due to thermal expansion, without breaking, peeling off or damaging the substrate.

Recent developments have led to two-component compositions based on silane-functional polymers with fast through cure and promising mechanical properties suitable as joint sealants. However, especially if they are formulated with highly reactive trifunctional silane polymers, such as trimethoxysilane-terminated polymers, the component containing the highly reactive polymers requires careful drying of ingredients, such as fillers, in order to obtain an acceptable shelf life. Such sealants in general often suffer from poor adhesion properties and require the use of adhesion promoters if used without pretreatment. On the other hand, compositions primarily based on less reactive bifunctional silane polymers, such as methyldimethoxysilane-terminated polymers, do generally offer better shelf life, but they are slower in curing and are often not able to fulfill the most demanding mechanical requirements in terms of resilience, tensile strength, and durability. Therefore there is still a demand for a simple, inexpensive two-component solution for joint sealants based on silane-functional polymers, which combines the advantages of low E-modulus, fast curing, long shelf life, excellent adhesion properties and outstanding durability in high movement joints, without the need for adhesion promoters, drying of the components, or expensive packaging.

SUMMARY OF THE INVENTION

Therefore, the object of the present invention is to provide a two-component composition based on silane-functional polymers which has a low E-modulus, long open time, but fast through curing, and at the same time offers excellent shelf life and in its cured state offers excellent durability.

Surprisingly, this object could be achieved by the two-component composition with the features of independent claim 1.

Such two-component compositions according to the present invention are especially suitable for being used as a low modulus joint sealant and they possess outstanding durability in joints with high movement of the substrates. Further advantages of the inventive compositions include the possibility to use undried fillers, excellent adhesion properties and high storage stability.

Further aspects of the present invention are object of other independent claims. Preferred embodiments of the present invention are object of the dependent claims.

DETAILED DESCRIPTION OF THE INVENTION

In a first aspect, the object of the present invention is a two-component composition comprising
a) a first component A, comprising
between 50% and 100% by weight of at least one silane-functional polymer P selected from formula (I), (II), and/or (III)

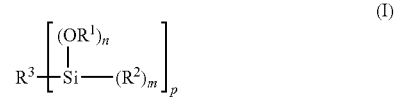

(I)

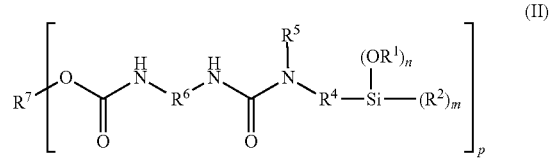

(II)

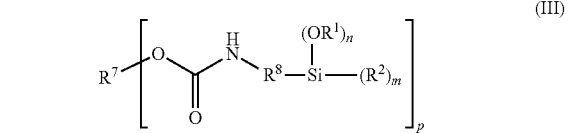

(III)

wherein
radicals $R^1$ and $R^2$ independently represent a linear or branched monovalent hydrocarbon radical having 1 to 10 carbon atoms;
radical $R^3$ represents a polyether or poly(meth)acrylate polymer after removal of p silane groups;

radical $R^4$ represents a linear or branched divalent hydrocarbon radical having 1 to 6 carbon atoms and optionally containing one or more heteroatoms, preferably a propylene radical;

radical $R^5$ represents a dialkyl succinate radical;

radical $R^6$ represents a divalent aliphatic hydrocarbon radical having 1 to 15 carbon atoms;

radical $R^7$ represents a hydroxyl-terminated polyether or polyurethane polymer after removal of p hydroxyl groups;

radical $R^8$ represents a divalent linear or cyclic hydrocarbon radical having 1 to 15 carbon atoms and optionally containing heteroatoms, preferably a methylene or propylene radical;

n represents an integer having a value of 2 or 3;

m represents an integer having a value of 3-n;

p represents an integer having a value of at least 2, preferably 2 or 3; and between 0% and 50% by weight of at least one plasticizer; and between 0% and 10% by weight of at least one organosilane OS; and between 0% and 5% by weight of at least one drying agent;

wherein component A does not contain filler and component A is essentially free of catalyst for catalyzing hydrolysis and/or condensation of organosilanes and wherein the amounts of all individual components comprised in component A are adjusted such that their sum equals 100%;

and a) a second component B, comprising between 0.05% and 4% by weight of a catalyst for catalyzing hydrolysis and/or condensation of organosilanes; and between 25% and 75% by weight of at least one filler; and between 0% and 60% by weight of at least one plasticizer; and between 0% and 0.5% of at least one stabilizer;

wherein the amounts of all individual components comprised in component B are adjusted such that their sum equals 100%;

wherein the mixing ratio by weight of component A to component B is between 1:1 and 1:5, preferably between 1:2 and 1:4.

Substance names beginning with "poly" such as polyol or polyisocyanate in the present document refer to substances that formally contain two or more of the functional groups occurring in their name. The term "polymer" in the present document includes, on one hand, a collection of macromolecules that are uniform chemically but differ with respect to the degree of polymerization, the molecular weight and the chain length and were synthesized by a polyreaction (polymerization, polyaddition, polycondensation). On the other hand, this term also includes derivatives of such a group of macromolecules of polyreactions, i.e., compounds obtained by reactions, such as additions or substitutions of functional groups on given macromolecules and they may be chemically uniform or chemically heterogeneous. This term also includes so-called prepolymers, i.e., reactive oligomeric preadducts, whose functional groups are involved in the synthesis of macromolecules.

The term "polyurethane polymer" includes all polymers synthesized by the so-called diisocyanate polyaddition process. This also includes polymers which are almost or entirely free of urethane groups. Examples of polyurethane polymers include polyether polyurethanes, polyester polyurethanes, polyether polyureas, polyureas, polyester polyureas, polyisocyanurates and polycarbodiimides.

In the present document, the terms "silane" and "organosilane" refer to compounds which, on one hand, have at least one, usually two or three, alkoxy groups or acyloxy groups bound directly to the silicon atom by Si—O bonds and, on the other hand, at least one organic radical bound directly to the silicon atom by an Si—C bond. Those skilled in the art are also familiar with such silanes as organoalkoxysilanes and/or organoacyloxysilanes.

Accordingly, the term "silane group" refers to the silicon-containing group bound to the organic radical of the silane via the Si—C bond. The silanes and/or their silane groups have the property of undergoing hydrolysis upon contact with moisture. In doing so, organosilanols are formed, i.e., organosilicon compounds containing one or more silanol groups (Si—OH groups) and, for subsequent condensation reactions, organosiloxanes, i.e., organosilicon compounds containing one or more siloxane groups (Si—O—Si groups). The term "silane-functional" denotes compounds containing silane groups. "Silane-functional polymers" are thus polymers containing at least one silane group. Similarly, the term "isocyanate-functional" denotes compounds containing an isocyanate functional group.

Organosilanes, in which the organic radical has an amino group, are referred to as "aminosilanes". "Primary aminosilanes" are aminosilanes having a primary amino group, i.e., an $NH_2$ group bound to an organic radical. "Secondary aminosilanes" are aminosilanes having a secondary amino group, i.e., an NH group bound to two organic radicals.

"Molecular weight" is always understood in the present document to refer to the molar mass (in grams per mole) of a molecule. The term "average molecular weight" herein means "average molar mass" $M_n$ of an oligomer or polymer and describes the number average molar mass of a mixture of oligomer or polymer molecules, typically measured by gel permeation chromatography (GPC) in THF using a polystyrene standard.

The term "weight" in this document is used to describe the physical mass, as measured, e.g., in grams by a balance. Accordingly, percentages by weight, written as "% by weight" or abbreviated "wt.-%" refer to a mass percentage based on the total mass of a composition or compound, respective of the context.

The inventive two-component composition comprises at least two components, hereinafter denoted as component A and component B. Component A and component B are produced separately, stored in separated packages, and preferably combined only immediately before application. With this approach, all the advantageous properties of the invention can be achieved in an optimal way.

The two-component composition according to the present invention comprises in component A at least one silane-functional polymer P selected from formula (I), (II), and/or (III)

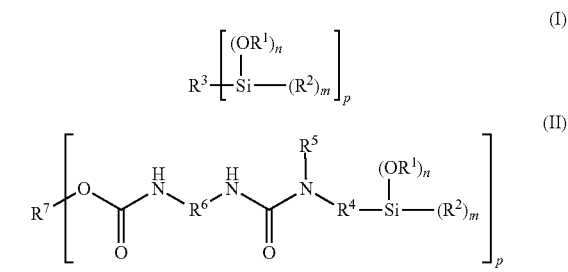

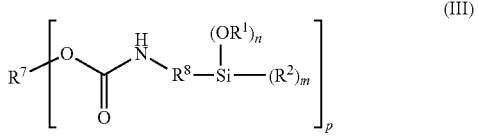

The radicals R¹ and R² in formula (I), (II), and (III) independently represent a linear or branched monovalent hydrocarbon radical having 1 to 10 carbon atoms. Preferably, the radicals R¹ and R² represent methyl, ethyl, or propyl radicals. Especially preferred are methyl or ethyl radicals, most preferred are methyl radicals. Also mixtures of different alkyl radicals are possible.

Radical R³ in formula (I) represents the rest of a polyether or poly(meth)acrylate polymer after removal of p silane groups. Index n in all formulae represents an integer having a value of 2 or 3, while index m represents an integer having a value of 3-n. Index p represents an integer having a value of at least 2, preferably 2 or 3.

Radical R⁴ in formula (II) represents a linear or branched divalent hydrocarbon radical having 1 to 6 carbon atoms and optionally containing one or more heteroatoms. In preferred embodiments, R⁴ represents a methylene, n-propylene, 3-aza-n-hexylene, or a 3-aza-n-pentylene group. Most preferred are n-propylene and methylene, in particular n-propylene.

Radical R⁵ represents a dialkyl succinate radical. Preferred are dimethyl succinate and diethyl succinate, in particular diethyl succinate.

Radical R⁶ represents a divalent aliphatic hydrocarbon radical having 1 to 15 carbon atoms, in particular isophorone diisocyanate after removal of the two isocyanate groups.

Radical R⁷ represents a hydroxyl-terminated polyether or polyurethane polymer after removal of p hydroxyl groups.

Radical R⁸ represents a divalent linear, branched, or cyclic hydrocarbon radical having 1 to 15 carbon atoms and optionally containing heteroatoms. Preferably, R⁸ represents a methylene or n-propylene radical.

It is possible and in certain embodiments advantageous if the inventive composition comprises more than one type of polymer P. Those can differ in any of the parameters above, e.g. in R³, p, or m.

In a first embodiment, polymer P comprises or consists of at least one polymer P1 according to formula (I).

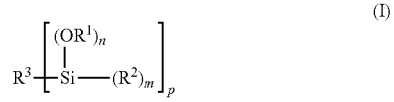

Radicals R¹, R², and R³ and indices m, n, and p in formula (I) have the same meaning as described above.

Polymers P1 are silane-functional polyether and/or poly (meth) acrylate polymers, or blends thereof, which are manufactured, e.g., by copolymerization of unsaturated monomers, such as (meth)acrylates, with small amounts of vinylsilanes or by hydrosilylation reactions of polyether and/or poly(meth)acrylate polymers having unsaturated C—C bonds, in particular from allyl-terminated polyoxyalkylene polymers, described for example in U.S. Pat. Nos. 3,971,751 and 6,207,766.

Preferably, polymers P1 have polyether backbones having a molecular weight of between 4'000 and 40'000 g/mol and comprising polypropylene glycol and/or polyethylene glycol moieties. The term "backbone" refers to the polymer chain without the silane-functionalization, in this case R³ in formula (I).

For example, suitable silane-functional polymers P1 are commercially available under the trade names MS Polymer™ S203H, S303H, S227, S810, MA903 and S943, Silyl™ SAX220, SAX350, SAX400 and SAX725, Silyl™ SAT350 and SAT400, and XMAP™ SA100S and SA310S of the Kaneka Corp., Japan, as well as under the trade names Excestar® S2410, S2420, S3430, S3630, W2450 and MSX931 by Asahi Glass Co., Ltd., Japan.

In a second embodiment, polymer P comprises or consists of at least one polymer P2 according to formula (II).

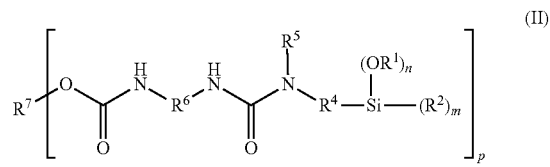

Radicals R¹, R², R⁴, R⁵, R⁶, and R⁷ and indices m, n, and p in formula (II) have the same meaning as described above.

Polymer P2 is a polymer obtained by the reaction of an isocyanate-functional prepolymer PUR with an aminosilane endcapper E. This aminosilane endcapper E has a secondary amino group. For this reaction, approximately p molar equivalents of an aminosilane endcapper E are reacted with 1 molar equivalent of a polymer PUR having p NCO-groups. It may be advantageous to use a slight molar excess, for example up to 10%, of aminosilane endcapper E, in order to ensure that as little as possible of free NCO groups are remaining in the polymer after reaction. This is advantageous for health and safety reasons, as isocyanates are considered toxic.

The isocyanate-functional polyurethane polymer PUR can be obtained in particular by the reaction of at least one polyol with at least one polyisocyanate.

This reaction can be performed by using known methods, for example by reacting the polyol with the polyisocyanate at temperatures between 50° C. and 100° C., optionally using a suitable catalyst.

In particular the polysiocyanate is dosed in a way that the molar ratio of isocyanate groups of the polyisocyanate to hydroxyl groups of the polyol is greater than 1, i.e. the isocyanate groups are present in molar excess.

This molar excess of isocyanate groups is in particular adjusted such that after reaction of the polyisocyanate with the polyol, the amount of remaining isocyanate groups in the resulting polyurethane polymer PUR is between 0.1 and 5 wt.-%, preferably between 0.1 and 2.5 wt.-%, more preferably between 0.2 and 1 wt.-%, based on the weight of the polyurethane polymer PUR.

Optionally, the polyurethane polymer PUR can be prepared using plasticizers or solvents which however should not contain any functional groups that can react with isocyanates.

Preferably the polyurethane polymer PUR is prepared resulting in the above-mentioned excess of isocyanate groups compared to hydroxyl groups by using diisocyanates and high molecular weight diols and a molar ratio of NCO:OH of between 1.3:1 and 2.2:1.

Suitable polyols for the preparation of the isocyanate-functional polyurethane polymer are in particular polyoxyalkylenepolyethylenepolyols, also referred to as polyether polyols, polyester polyols, polycarbonate polyols and mixtures thereof. The most preferred polyols are diols, in particular polyether diols, including polyoxyethylene diols, polyoxypropylene diols or polyoxybutylene diols.

Particularly suitable polyetherpolyols, also referred to as polyoxyalkylenepolyols or oligoetherols, are those which are polymerization products of ethylene oxide, 1,2-propylene oxide, 1,2- or 2,3-butylene oxide, oxethane, tetrahydrofurane or mixtures thereof, optionally polymerized with the aid of an initiator having two or more active hydrogen atoms per molecule, such as, for example, water, ammonia or compounds having a plurality of OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of said compounds. Both polyoxyalkylenepolyols which have a low degree of unsaturation (measured according to ASTM D-2849-69 and stated in milliequivalent unsaturation per gram of polyol (meq/g)), prepared, for example, with the aid of so-called double metal cyanide complex catalysts (DMC catalysts), and polyoxyalkylenepolyols having a higher degree of unsaturation, prepared, for example, with the aid of anionic catalysts, such as NaOH, KOH, CsOH or alkali metal alcoholates, may be used.

Polyoxyethylenepolyols and polyoxypropylenepolyols, in particular polyoxyethylenediols, polyoxypropylenediols, polyoxyethylenetriols and polyoxypropylenetriols, are particularly suitable.

Polyoxyalkylenediols or polyoxyalkylenetriols having a degree of unsaturation of less than 0.02 meq/g and having a molecular weight in the range from 1'000 to 40'000 g/mol and polyoxyethylenediols, polyoxyethylenetriols, polyoxypropylenediols and polyoxypropylenetriols having a molecular weight of from 400 to 30'000 g/mol, preferably 3'500 to 25'000 g/mol, more preferably 4'000 to 18'000 g/mol, are particularly suitable.

Also particularly suitable are so-called ethylene oxide-terminated ("EO-endcapped", ethylene oxide-endcapped) polyoxypropylenepolyols. The latter are special polyoxypropylenepolyoxyethylenepolyols which are obtained, for example, by further alkoxylating pure polyoxypropylenepolyols, in particular polyoxypropylenediols and -triols, with ethylene oxide after the end of the polypropoxylation reaction and have primary hydroxyl groups as a result. In this case, polyoxypropylenepolyoxyethylenediols and polyoxypropylenepolyoxy-ethylenetriols are preferred.

Further suitable polyols are poly(meth)acrylate polyols.

Polyhydroxy-functional fats and oils, for example natural fats and oils, in particular castor oil, or polyols obtained by chemical modification of natural fats and oils, so-called oleochemical polyols, the epoxypolyesters or epoxypolyethers obtained, for example, by epoxidation of unsaturated oils and subsequent ring opening with carboxylic acids or alcohols, or polyols obtained by hydroformylation and hydrogenation of unsaturated oils are furthermore suitable. These are furthermore polyols which are obtained from natural fats and oils by degradation processes, such as alcoholysis or ozonolysis, and subsequent chemical linkage, for example by transesterification or dimerization, of the degradation products thus obtained or derivatives thereof. Suitable degradation products of natural fats and oils are in particular fatty acids and fatty alcohols and fatty acid esters, in particular the methyl esters (FAME), which can be derivatized, for example, by hydroformylation and hydrogenation to give hydroxy-fatty acid esters.

Furthermore, polyhydrocarbon-polyols, also referred to as oligohydro-carbonols, for example polyhydroxy-functional ethylene-propylene, ethylene-butylene or ethylene-propylene-diene copolymers, as produced, for example, by Kraton Polymers, USA, or polyhydroxy-functional copolymers obtained from dienes, such as 1,3-butadiene or diene mixtures, and vinyl monomers, such as styrene, acrylonitrile or isobutylene, or polyhydroxy-functional polybutadiene polyols, for example those which can be prepared by copolymerization of 1,3-butadiene and allyl alcohol or by oxidation of polybutadiene and can also be hydrogenated, are likewise suitable.

Polyhydroxy-functional acrylonitrile/butadiene copolymers, as can be prepared, for example, from epoxides or amino alcohols and carboxyl-terminated acrylonitrile/butadiene copolymers (commercially available under the name Hypro® CTBN from Emerald Performance Materials, LLC, USA), are furthermore suitable.

Said polyols preferably have an average molecular weight of from 250 to 40'000 g/mol, in particular from 1'000 to 30'000 g/mol, and an average OH functionality in the range from 1.6 to 3. The term "functionality" describes the average number of specific functional groups on one molecule.

Particularly suitable polyols are polyetherpolyols, in particular polyoxyethylenepolyol, polyoxypropylenepolyol and polyoxy-propylenepolyoxyethylenepolyol, preferably polyoxyethylenediol, polyoxy-propylenediol, polyoxyethylenetriol, polyoxypropylenetriol, polyoxypropylene-polyoxyethylenediol and polyoxypropylenepolyoxyethylenetriol.

In addition to said polyols, small amounts of low molecular weight di- or polyhydric alcohols, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the above-mentioned di- and polyhydric alcohols, and mixtures of the above-mentioned alcohols can be concomitantly used in the preparation of the isocyanate-functional polyurethane polymer PUR, i.e. the polyurethane polymer having isocyanate groups.

Depending on the polyols used and their number of hydroxyl groups per molecule, it is possible to prepare isocyanate-functional polyurethane polymers with 1 or more free terminal isocyanate groups per polymer PUR. For the inventive two-component composition it is preferred to prepare polymers PUR with in average 2 to 4 isocyanate groups per polymer molecule. Most preferred embodiments have in average 2 to 3 isocyanate groups per polymer PUR.

As concerns the polyisocyanate, the present application prefers aliphatic or cycloaliphatic polyisocyanates, in particular diisocyanates, such as for example 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane), m- and p-xylylene diisocyanate (m- and p-XDI), m- and p-tetramethyl-1,3-xylylene diisocyanate, m- and p-tetramethyl-1,4-xylylene diisocyanate; oligomers and polymers of the abovementioned isocyanates, and any desired mixtures of the abovementioned isocyanates.

In the practice of the present application it is particularly preferred that the polyisocyanate is IPDI or a prepolymer containing terminal IPDI groups, e.g. a polyether containing terminal IPDI groups.

Aminosilane endcapper E used together with isocyanate-functional polyurethane polymer PUR for producing polymer P2 has a structure according to formula (IIa).

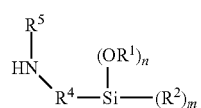
(IIa)

$R^1$, $R^2$, $R^4$, and $R^5$ have the same meaning as described further above.

Preferred embodiments of aminosilane endcapper E have a structure according to formula (IIa1) or (IIa2).

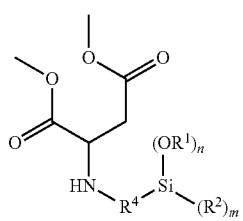
(IIa1)

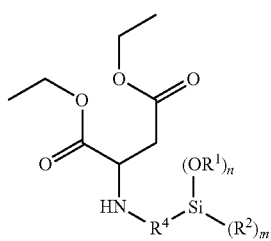
(IIa2)

$R^1$, $R^2$, $R^4$, and $R^5$ have the same meaning as described further above. Most preferred aminosilane endcappers E have a structure according to formula (IIa2), in particular those where $R^4$ is a propylene radical and/or $R^1$ is a methyl radical.

The aminosilane endcapper E is manufactured by the reaction of an aminosilane AS according to formula (IIb) with a Michael acceptor M according to formula (IIc1) or (IIc2)

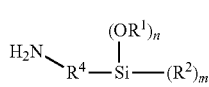
(IIb)

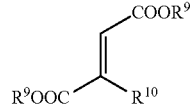
(IIc1)

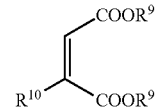
(IIc2)

wherein radicals $R^1$, $R^2$, and $R^4$ and indices m and n have the same meaning as described further above;

radical $R^9$ represents a linear or branched monovalent hydrocarbon radical having 1 to 20 carbon atoms, preferably a methyl or ethyl group;

radical $R^{10}$ represents a hydrogen radical or a radical selected from the group —$R^9$, —CN, or —$NO_2$.

Thus, the synthesis of polymer P2 is preferably a two-step process. The first step is the synthesis of the aminosilane endcapper E which afterwards in a second step is used to introduce the silane-function to the polymer P2 by endcapping the isocyanate-functional polyurethane polymer PUR via the reaction of the secondary amine group of the endcapper E with an isocyanate group of the isocyanate-functional polyurethane polymer PUR. More specifically, these two steps include:

i) the reaction of an aminosilane AS according to formula (IIb)

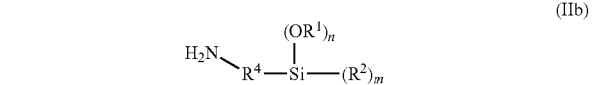
(IIb)

with a Michael acceptor M according to formula (IIc1) or (IIc2);

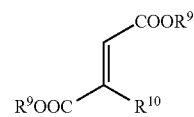
(IIc1)

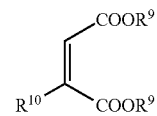
(IIc2)

ii) the reaction of p equivalents of the reaction product of i) with one equivalent of an isocyanate-functional polyurethane polymer PUR having p isocyanate groups.

The corresponding radicals $R^1$, $R^2$, $R^4$, $R^9$, $R^{10}$ and parameter p were described further above.

The reaction of the aminosilane AS according to formula (IIb) in step i) of the method is preferably performed at a temperature of between 0° C. and 140 C, in particular between 20° C. and 100° C. In preferred embodiments, the molar ratio of aminosilane AS to Michael acceptor M is approximately 1:1.

Suitable aminosilanes AS include all compounds described by formula (IIb). In preferred embodiments, radicals $R^1$ and $R^2$ in formula (IIb) each independently represent a methyl, ethyl, or isopropyl group. In the same or different preferred embodiments, $R^4$ of formula (IIb) represents a methylene, n-propylene, 3-aza-n-hexylene, or 3-aza-n-pentylene group, preferably a n-propylene group or a 3-aza-n-hexylene group.

Especially preferred aminosilanes AS are 3-aminopropyl methyl dimethoxysilane and 3-aminopropyl trimethoxysilane.

Suitable Michael acceptors M include all of the options described by formula (IIc1) or (IIc2), while preferred Michael acceptors M are maleic acid esters and fumaric acid esters, in particular methyl esters and ethyl esters of those compounds. Most preferred Michael acceptor M is maleic acid diethyl ester.

During reaction step i) as described above the amino group or the amino groups of the aminosilane AS described by formula (IIb) undergo a Michael-type addition to the olefin group of the Michael acceptor M described by formula (IIc1) or (IIc2). Such addition reactions are known to the ordinarily skilled artisan and for instance described in U.S. Pat. No. 5,364,955.

The reaction of aminosilane AS according to formula (IIb) with Michael acceptor M according to formula (IIc1) or (IIc2) can be done solventless or using a solvent, for example dioxane. It is however preferred to do it solventless if possible.

Of course it is possible to use a mixture of aminosilanes AS and/or a mixture of Michael acceptors M in the reaction instead of pure substances.

In preferred embodiments of step i) of the method of manufacturing a polymer P2 described above, aminosilane AS is 3-aminopropyl methyl dimethoxysilane or 3-aminopropyl trimethoxysilane and Michael acceptor M is maleic acid diethyl ester or fumaric acid diethyl ester.

The second reaction step of the synthesis of polymer P2 of said preferred embodiment, described as step ii) further above, i.e. the reaction of p equivalents of the reaction product of i) with one equivalent of an isocyanate-functional polyurethane polymer PUR having p isocyanate groups, or in other words the reaction of the silane-functional endcapper E with the isocyanate-functional polyurethane polymer PUR, is performed using conditions that are known to the ordinarily skilled artisan in the field of polyurethane chemistry. Preferably, in this step the molar ratio of secondary amine groups of all employed endcappers E to isocyanate groups of all employed polyurethane polymers PUR is approximately 1:1, or with a slight molar excess of secondary amine groups to isocyanate groups, such that the resulting polymer P after this reaction is essentially depleted of isocyanate groups.

For instance, the reaction of the product of reaction step i) as described above with isocyanate-functional polymer PUR preferably proceeds in a temperature range of between 0° C. and 150° C., in particular between 25° C. and 110° C. The reaction time for this reaction depends largely on the reactants used and the reaction temperature employed; hence the reaction is typically monitored by infrared (IR) spectroscopy to determine the exact end point, following well-known procedures. Preferably the reaction is stopped when no more isocyanate groups can be detected by IR spectroscopy. For example, when working solventless and at a reaction temperature of 90° C., the reaction time is typically approximately between 1 minute and 10 hours, preferably between 0.5 and 6 hours, depending on the reactivity of the reactants used, until no more isocyanate groups can be detected by IR spectroscopy, i.e. the intensity of the IR absorption of isocyanate has decreased by at least 99%.

Both reaction steps i) and ii) are preferably done without catalyst that catalyzes the condensation of silanes. Suitable catalysts are the ones normally used in the field of polyurethane chemistry and those well known to the ordinarily skilled artisan. For example, especially suitable catalysts are Bismuth catalysts such as Bi(III) neodecanoate, available for example under the trade name Coscat® 83 by Vertellus Specialties, USA. It is however preferred not to use catalysts, especially not those that are also active silane-curing catalysts, for instance tin complexes, as such compounds may decrease the shelf life of component A if traces of them remain in the polymer P2 after synthesis. Not using such catalysts thus has the advantage that the reaction product can be used without special workup or purification.

In a third embodiment, the silane-functional polymer P comprises or consist of at least one silane-functional polymer P3 according to formula (III).

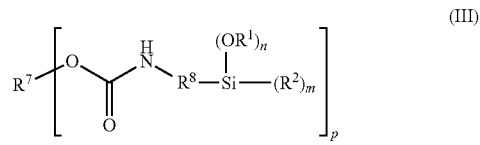

(III)

Radicals $R^1$, $R^2$, $R^7$, and $R^8$ and indices m, n, and p in formula (III) have the same meaning as described above.

Polymer P3 is obtainable by the reaction of an isocyanatosilane IS with a polymer containing isocyanate-reactive functional end groups, in particular hydroxyl, mercapto and/or amino groups, in the latter two cases however formula (III) has a nitrogen or sulfur atom bound to $R^7$, respectively. Most preferred are polymers having hydroxyl groups, such as hydroxyl-terminated polyether polymers or hydroxyl-terminated polyurethane polymers.

This reaction takes place in a stoichiometric ratio of isocyanate groups to isocyanate-reactive functional end groups of approximately 1:1, or with a slight excess of the isocyanate groups, for example at temperatures from 20° C. to 100° C., optionally with the co-use of catalysts and/or plasticizers or solvents.

Suitable isocyanatosilanes IS are compounds of the formula (IIIb).

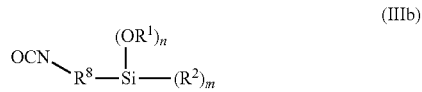

(IIIb)

wherein radicals $R^1$, $R^2$, and $R^8$ and indices m and n have the same meaning as described above.

Examples of suitable isocyanatosilanes IS the formula (V) are isocyanatomethyl trimethoxysilane, isocyanatomethyl dimethoxymethylsilane, 3-isocyanatopropyl trimethoxysilane, 3-Isocyanatopropyl dimethoxymethylsilane, and their analogs with ethoxy or isopropoxy groups instead of the methoxy groups on the silicon atom. Most preferred are methoxysilanes.

For preferred embodiments, polymers containing hydroxyl groups are used for the reaction with isocyanatosilanes IS. Suitable are in particular high molecular weight polyoxyalkylene polyols, preferably polyoxypropylene diols having a degree of unsaturation of less than 0.02 meq/g and having a molecular weight in the range of 4'000 to 40'000 g/mol, especially those having a molecular weight in the range of 8'000 to 30'000 g/mol.

Furthermore preferred are hydroxyl-terminated polyurethane polymers for the reaction with isocyanatosilanes IS. Such polyurethane polymers are obtainable by reacting at least one polyisocyanate with at least one polyol, as described further above for the isocyanate-functional polymer PUR. This reaction takes place in the same way as the production of polymer PUR, for example at temperatures from 50° C. to 100° C., optionally with the use of suitable catalysts. However, in this case, the polyol has to be used in amounts such that the hydroxyl groups in relation to the isocyanate groups of the polyisocyanate are in stoichiometric excess. Preferred is a ratio of hydroxyl groups to isocyanate groups of between 1.3:1 and 4:1, in particular between 1.8:1 and 3:1.

Optionally, the polyurethane polymer can be prepared with the concomitant use of plasticizers or solvents, in which case however the plasticizers or solvents should not contain isocyanate-reactive groups. Suitable compounds and conditions are the same as for the production of polymer PUR described further above.

For example, suitable silane-functional polymers P3 are commercially available under the trade names SPUR+® 1010LM, 1015LM and 1050MM from Momentive Performance Materials Inc., USA, and under the trade names Geniosil® STP-E15, STP-10 and STP-E35 from Wacker Chemie AG, Germany.

It is possible to use a mixture of several such polymers P1, P2, and/or P3 as polymer P.

Component A of the inventive two-component composition comprises polymer P with an amount of between 50 wt.-% and 100 wt.-%, based on the total weight of component A. Thus, component A can entirely or essentially consist of polymer P. It is however advantageous in some embodiments that component A also comprises plasticizer, especially in cases where polymer P is highly viscous. In preferred embodiments, the amount of polymer P in component A of the inventive two-component composition is between 55 wt.-% and 90 wt.-%, preferably between 60 wt.-% and 85 wt.-% of polymer P, based on the total weight of component A of the inventive two-component composition.

In preferred embodiments, component A furthermore comprises at least one organosilane OS. This is a compound having both at least one hydrolyzable silane group and at least one other functionality. Example of such organosilanes include aminosilanes, including those described by formula (IIb) further above, glycidoxysilanes, mercaptosilanes, vinylsilanes, epoxy silanes, (meth)acrylate silanes, anhydrido silanes, or adducts of these silanes with amino silanes, as well as urea silanes and the like. Such organosilanes are well known to the person of average skill in the field of silane-functional polymer formulations.

Organosilanes OS can improve the properties of the inventive two-component compositions. For example, aminosilanes and mercaptosilanes improve adhesion on many substrates, glycidoxysilanes improve adhesion, especially under wet conditions, and vinylsilanes improve storage stability of component A.

Such organosilanes OS can be used as monomeric or at least partially condensated oligomeric species. Examples of suitable organoslianes OS for the present invention include 3-aminopropyl methyl dimethoxysilane, 3-aminopropyl trimethoxysilane, 3-glycidoxypropyl trimethoxysilane, 3-mercaptopropyl trimethoxysilane, N-aminoethyl-3-aminopropyl trimethoxysilane and mixtures and oligomers thereof. It is known to the person skilled in the field that the exact type, mixture, or amount of organosilane OS can be optimised according to the substrate on which the inventive two-component composition is to be applied for optimal adhesion results.

For the present invention, organosilanes OS are preferably comprised in component A only. If present, they can be comprised in component A with an amount up to 10 wt.-%, without compromising the mechanical properties of the cured two-component composition. In preferred embodiments, component A comprises between 0.5 wt.-% and 7.5 wt.-%, in particular between 1 wt.-% and 5 wt.-%, based on the total weight of component A, of organosilane OS.

The inventive two-component composition contains at least one filler. Said filler cannot be included in component A and therefore must be comprised in component B. The filler influences both the rheological properties of the composition before curing, and the mechanical properties and the surface smoothness of the composition after curing. Suitable fillers include inorganic and organic fillers, for example natural, ground or precipitated calcium carbonates which optionally are coated by fatty acids, preferably stearates, barium sulphate, calcined kaolin, aluminum oxide, aluminum hydroxide, silica, particularly highly dispersed pyrogenic silica, carbon black, PVC powder or hollow microspheres.

Preferably, the fillers are undried. This offers the advantage of faster curing as the contained water can react with the reactive functional groups of the polymer. "Undried" means that the fillers are used as received by the supplier without drying them before formulation of the composition. Fillers such as calcium carbonate are used in significant amounts in such formulations, for example between 25 wt.-% and 60 wt.-%, based on the total composition, and commercially available fillers such as calcium carbonate contain up to 0.5 wt.-% of water or more, stemming from adsorption from humid air or elsewhere. One-component compositions containing reactive components, catalyst and water are normally not stable and have poor shelf life. The inventive two-component composition however can be formulated with undried fillers, which allows for an economically more favorable formulation as the drying step of the filler can be omitted, and the water contained in the filler accelerates curing when the two components are mixed together. Therefore, preferred embodiments of the inventive two-component compositions use undried filler.

In the present invention, component B comprises between 25 wt.-% and 75 wt.-%, preferably between 30 wt.-% and 65 wt.-%, based on the total weight of component B, of at least one filler.

Preferred fillers include calcium carbonate, calcinated kaolin, carbon black, hollow or gas-filled microspheres (light-weight fillers), highly dispersed silica and flame-retardant fillers, such as hydroxides, hydrates, or melamines, in particular hydroxides or hydrates of aluminum. Most preferred fillers are calcium carbonate, especially undried calcium carbonate, and light weight fillers comprising hollow microspheres, for example obtainable by Matsumoto Yushi Corp., Japan.

It is possible and can be advantageous to use a mixture of different fillers, such as a mixture of different calcium carbonates and/or a mixture of calcium carbonate with hollow microspheres.

Thus, in a preferred embodiment of the two-component composition according to the present invention, component B comprises undried calcium carbonate, preferably with a water content of between 0.01 wt.-% and 1.5 wt.-% of water, preferably between 0.05 wt.-% and 1 wt.-% of water, based on the weight of the calcium carbonate.

When using hollow microspheres, for example to reduce the overall density of component B in the two-component composition, it is preferred to use between 0.5 wt.-% and 5 wt.-%, more preferably between 1 wt.-% and 4 wt.-%, based on the total weight of component B.

Furthermore, component B of the inventive two-component composition comprises a catalyst for catalyzing hydrolysis and/or condensation of silanes. Such a catalyst system may comprise a single substance, or several substances with preferably synergistic properties, able to catalyze the hydrolysis and/or condensation of organosilanes OS and especially the polymers P comprised in component A.

Said catalyst is comprised in component B with an amount of between 0.05 wt.-% and 4 wt.-%, preferably between 0.1 wt.-% and 2.5 wt.-%, based on the total amount of component B.

Suitable catalysts include for example metal complexes, such as tin or titanium compounds, and/or amine compounds such as for example 1,4-Diaza-bicyclo[2.2.2]octane, 2,2'-Dimorpholinodiethylether, or linear or branched monoalkylamines.

Preferred catalysts comprise at least one tin compound and preferably additionally at least one amine compound.

Other preferred catalyst systems comprise at least one titanium compound, preferably in combination with at least one amine compound.

Preferred tin compounds include tin complexes with alkoxy- and/or carboxylate ligands, such as dibutyltin dilaurate, dibutyltin diacetylacetonate, or the corresponding dioctyltin complexes, tin(II) octoate, or dioctyl tin oxide. Most preferred is tin(II) 2-ethylhexanoate (stannous octoate).

Preferred amine compounds, especially in combination with a tin compound, are linear or branched monoalkylamines, preferably with 1 to 24 carbon atoms in their alkyl substituent, more preferably with 8 to 24 carbon atoms.

Most preferred catalyst systems comprise a combination of a tin compound and an amine, for example tin octoate and dodecyl amine.

In a preferred embodiment, component B comprises at least one tin compound with an amount between 0.05 wt.-% and 2.5 wt.-%, preferably between 0.1 wt.-% and 1.5 wt.-%, based on the total weight of component B, and at least one amine compound with an amount of between 0 wt.-% and 1 wt.-%, preferably between 0.1 wt.-% and 0.5 wt.-%, based on the total weight of component B.

Component A of the inventive two-component composition has to be essentially free of such a catalyst for hydrolysis and/or condensation of organosilanes. Without this restriction, the storage stability of component A may be significantly lower than intended by the present invention. "Essentially free of" means that less than 0.05 wt.-%, preferably less than 0.03 wt.-%, in particular less than 0.01 wt.-%, based on the total weight of component A, of such a catalyst should be comprised in component A. Aminosilanes alone are not regarded as catalyst in the sense of this invention, although they may, in combination with e.g. tin carboxylates, increase the catalytic activity of such metal complexes. Therefore, care has to be taken to avoid or at least minimize any possible amount of metal complexes in component A, in particular tin compounds. Such metal complexes may be present as remaining pollutants stemming from the synthesis of polymer P. It is advised to avoid or at least minimize their use during synthesis of polymer P, or, if unavoidable, to extract them by suitable means from the freshly synthesized polymer P.

The inventive two-component composition optionally comprises other additives which depending on their chemical properties may be comprised in component A, component B, or both. It is however preferred to add these additives to component B, as their addition may decrease storage stability of component A if they, for example, contain significant amounts of water.

Examples of such additives include:
plasticizers, e.g. carbonic acid esters or anhydrides, such as phthalates, for example dioctyl phthalate, diisononyl phthalate or diisodecyl phthalate, adipates, for example dioctyl adipate, azelates and sebacates, polyether or polyester polyols, such as polyoxyalkylene polyols, organic phosphoric or sulphonic acid esters, polybutenes;
solvents;
fibers, for example polyethylene fibers;
colorants or pigments;
rheology modifiers, such as urea compounds as described as "thixotropy endowning agent" in WO 02/48228 A2 on pages 9 to 11, polyamide waxes, bentonites, or pyrogenic silica;
stabilizers, for example against oxidation, heat, light- or UV radiation;
flame retardants;
surface-active substances such as surfactants, flowing aides, deaerating agents, or defoamers;
biocides, such as algicides or fungicides;
And other additives commonly used in elastic sealant compositions and known to the normally skilled artisan in the field of elastic sealant formulation.

It is advantageous to adjust all optional additives and constituents mentioned above in a way that the application properties or the shelf life of the composition are not adversely affected. For the inventive two-component composition this means that compounds which react with each other in an undesired way before application should not be in the same component A or B, but rather separated, if possible.

Since the two-component composition according to the present invention employs silane-functional polymers P and catalyst as well as filler in separated components, it is not necessary to dry those constituents, such as fillers, in order to ensure an acceptable shelf-life. It is even advantageous to use undried fillers in preferred embodiments, as the water contained therein accelerates the curing after mixing of components A and B and omitting the drying step for the filler facilitates the formulation of the two-component composition.

An especially preferred embodiment of the two-component composition according to the present invention is a composition wherein component A comprises between 50 wt.-% and 100 wt.-%, preferably between 55 wt.-% and 90 wt.-%, based on the total weight of component A, of at least one polymer P obtained by the method as described above, and between 0 wt.-% and 50 wt.-%, preferably between 10 wt.-% and 45 wt.-%, based on the total weight of component A, of at least one plasticizer, and between 1 wt.-% and 5 wt.-%, based on the total weight of component A, of at least one organosilane OS, wherein the amounts of all individual components comprised in component A are adjusted such that their sum equals 100%, and wherein component B comprises between 25 wt.-% and 75 wt.-%, preferably between 30 wt.-% and 65 wt-%, based on the total weight of component B, of at least one filler, and between 0.05% and 4%, preferably between 0.1% and 2.5% by weight, based on the total weight of component B, of at least one catalyst for catalyzing hydrolysis and/or condensation of organosilanes, and between 15% and 50%, preferably between 25% and 45% by weight, based on the total weight of component B, of at least one plasticizer, and between 0% and 0.4%, preferably between 0.1 and 0.25% by weight, based on the total weight of component B, of at least one stabilizer, wherein the amounts of all individual components comprised in component B are adjusted such that their sum equals 100%. The two components are preferably mixed in a ratio (w/w) of A:B of approximately 1:3.

Component A of the two-component composition according to the present invention is preferably stored in an air-tight containment such as a bag, unipack, cartridge, or the like, while component B can be stored in any containment such as a pail, or the like. Due to the two-component system, it is not crucial for the present invention to use a container that is highly impermeable to air or humidity for component B.

Component A and component B of the inventive two-component composition are produced and stored separately and preferably mixed shortly prior to application. It is advantageous to mix the two components directly in the container (e.g. a pail) of component B, as this component is generally larger in volume. With this approach, both components can be added together and mixed thoroughly, for example during 15 min using a hand-held blender or mixer. In some embodiments, other additives, such as colorants, can be added as well in this step to generate the desired end properties of the total composition, for example concerning esthetic appearance. Thus mixed components A and B of the present invention have typically a pot life of 1 to 5, preferably 2 to 4 hours, also depending on the climatic conditions. It is preferred to formulate and pack the components A and B in amounts that are directly compatible with each other in terms of amount per package unit, in order to facilitate application and avoid mixing errors. For example, in preferred embodiments the mixing ratio in terms of weight of component A to component B is between 1:2 and 1:4 (w/w).

The separately stored components A and B enable a shelf life of the inventive two-component composition of typically several months up to a year or longer, during which time the thus stored inventive two-component composition does not change significantly in its application properties, such as viscosity, or its final, mechanical or other, properties after curing.

Shelf life can be estimated for example by measuring the extrusion force or viscosity over time. A significant increase in extrusion force over short time, for example 1 month, typically means a poor shelf life.

Another aspect of the invention is the high durability of the inventive two-component composition after curing, especially in high movement joints. More specifically, preferred embodiments of the cured composition pass the durability test according to Japanese industrial standard JIS A 5758:2010 and reach classification 9030. High movement joints are typically joints between substrates that exhibit high thermal expansion and contraction, or such movement due to changing humidity.

The inventive two-component composition is suitable to be used as coating, sealant or adhesive, preferably as joint sealant. Preferred embodiments can be used as coating, sealant or adhesive without the need of pretreatment of the substrates, such as primers or adhesion promoters. This facilitates and accelerates their application.

A further aspect of the present invention is the cured or curing two-component composition according to the description above, obtained by mixing of component A and component B using a static or dynamic mixing system and applying the mixture to a substrate, preferably a joint.

EXAMPLES

The invention is further explained in the following experimental part which, however, shall not be construed as limiting to the scope of the invention. The proportions and percentages indicated are by weight, unless otherwise stated. Accordingly, "wt.-%" means percentage by weight, based on the weight of the total composition given in the respective case. "RT" means room temperature or ambient temperature and describes a temperature of 23° C. The abbreviation "r.h." or "% r.h." means relative humidity (in %) of the ambient air in a given example. The abbreviation "(w/w)" means weight per weight, proportion by weight, or for example weight ratio of two components that are mixed together. "Weight" and "mass" are used interchangeably in this document.

Test Methods

Tensile strength, elongation at break, and E-modulus (0-100%) were measured according to JIS A 5758:1992 using H-shape samples. Sample preparation was as follows: The aluminum platelets (50×50×3 mm) were pretreated with a specific primer (Sika Primer 80). The sealant bead was 12×12×50 mm in size. The samples were cured for 7 d at RT and 7 d at 50° C. For heat aging, the cured samples were kept for 2 w at 90° C. After completion of the tests (elongation until failure or break), the failure mode was classified for each sample according to the following codes: "Cf"=Cohesive failure, "TL"=Thin layer failure, "Af"=Adhesive failure.

Shore A and C hardness was measured according to JIS K 6253.

Viscosity measurements on the polymers were performed after storage in airtight aluminum cans during 1 day at RT. The measurements were done on a thermostatic cone-disc rheometer RC30 (Rheotec GmbH, Germany) at 20° C. (cone diameter 20 mm, cone angle 1°, distance between tip of the cone and disc 0.05 mm, shear rate 10 s$^{-1}$).

The shelf-life of B components was estimated by measuring the extrusion force according to the following procedure: The compositions were stored in airtight aluminum cartridges and conditioned during 1 day at RT before being extruded through a 3 mm nozzle using an extrusion machine (Zwick/Roell Z005). The force necessary to extrude the composition through the nozzle with a rate of 60 mm/min equals the initial extrusion force. A second measurement was done on an identical material, but out of a full cartridge again, which however had been conditioned during 7 days at 60° C. in order to simulate aging. In both measurements the values given were obtained from the average force value after extrusion of 22 mm, 24 mm, 26 mm and 28 mm. After 30 mm extrusion the measurements were stopped.

Penetration depth was measured according to ASTM D1321 and employing the following procedure: The freshly mixed sealant was placed into a 100 ml plastic beaker and the surface was flattened by a spatula. The sample was kept at RT and 50% r.h. for the indicated time (1, 3, 5 h). For the measurement, a thin needle (weight=10.27 g) was placed on the surface and released to penetrate into the sealant sample for 5 sec. The penetrated depth is given in 0.1 mm. High penetration value means low viscosity of the sealant.

Durability was tested according to JIS A 5758:2010 for the class 9030 (90° C., 30% compression/elongation). Sample preparation was as follows: The aluminum platelets (50×50×3 mm) were pretreated with specific primer (Sika Primer 80). The sealant bead was 12×12×50 mm in size. Sample curing and pre-aging was done as follows: The samples were cured for 7 d at 23° C./50% r.h. and 7 d at 50° C. Then two cycles of 24 h in water (50° C.), 24 h at 90° C. (not in water) with −30% compression, 7 d at −10 C with +30% compression were performed. 2000 compression/elongation cycles were repeated with compression/elongation at +/−30% (cycle time: 12 s)

The individual samples passed the testing, if they did not exhibit significant differences (such as cracks or other mechanical damages) compared to samples that had not undergone the durability procedure described above.

Bead adhesion was tested as given below. The substrates (Rocholl GmbH, Germany) were cleaned with Isopropyl alcohol and if necessary, pretreated with Sika Activator or Sika Primer 3N as given in the results table. After a flash-off time of 10 min (Sika Activator) or 30 min (Sika Primer 3N), the mixed sealant was applied as a bead (size: 15 mm×10 mm) on the substrates. After curing at standard climate (23° C., 50% r.h.) for 14 d the adhesion was tested for the first time by peeling and cutting the bead from the substrate. Further aging was done with dipping into water for 7 d (23° C.) and testing the adhesion properties again. Adhesion was judged according to the following scale: 1: >95% cohesive failure, 2: 75-95% cohesive failure, 3: 25-75% cohesive failure, 4: <25% cohesive failure.

Raw Materials Used

For the example compositions, both inventive and reference two-component compositions, the raw materials as listed in Table 1 were used without further purification as received, unless otherwise stated.

TABLE 1

Raw materials used in the exampe two-component compositions.

| Chemical compound | Trade name (producer) |
| --- | --- |
| 3-Aminopropyl methyl dimethoxysilane | KH-554 (Fedian Chemical, China). |
| 3-Aminopropyl trimethoxysilane | KBM-903 (Shin-Etsu Chemical, Japan) |
| N-Aminoethyl-3-aminopropyl methyl dimethoxysilane | KBM-602 (Shin-Etsu Chemical, Japan) |
| N-Aminoethyl-3-aminopropyl trimethoxysilane | KBM-603 (Shin-Etsu Chemical, Japan) |
| N-Phenyl-3-Aminopropyl trimethoxysilane | KBM-573 (Shin-Etsu Chemical, Japan) |
| 3-Isocyanatopropyl trimethoxysilane | Y-5187 (Momentive, Japan) |
| Maleic acid methyl ester | (Sigma Aldrich, Japan) |
| Lauryl acrylate | (Sigma Aldrich, Japan) |
| Polyether polyol (Diol, MW 12'000 g/mol) | Preminol S 4111 (Asahi Glass Corp., Japan) |
| Isophoron diisocyanate (IPDI) | Vestanat IPDI (Evonik, Japan) |
| Toluene diisocyanate (TDI) | Cosmonate T-80 (Mitsui Chemical, Japan) |
| Diisononyl phthalate (DINP) | Palatinol N (BASF, Japan) |
| Vinyl trimethoxysilane | KBM-1003 (Shin-Etsu Chemical, Japan) |
| Silane-functional polymer (MS Polymer) | MS Polymer S-810 (Kaneka Corp., Japan) |
| Lauryl amine | Farmin 20D (Kao Chemicals, Japan) |
| Tin octoate | Neostann U-28 (Nitto Kasei, Japan) |
| Bismuth(III) neodecanoate solution | Coscat 83 (Vertellus Specialities, USA) |
| Ground calcium carbonate (5 µm) undried with 0.1 wt.-% water | Special Rise Super SS (Maruo Calcium, Japan) |
| Precipitated calcium carbonate (0.08 µm) undried with 0.4 wt.-% water | Hakuenka CCR-B (Shiraishi Calcium, Japan) |
| UV-Stabilizer (benzotriazole-based) | SB-UVA626 (Shuang-Bang Industrial, Taiwan) |
| Antioxidant (hindered phenol) | Adeka Stab AO-50 (Adeka Corporation, Japan) |
| Light weight filler (thermoplastic microspheres, diameter between 5 and 50 µm) | Microballoon MFL-60A (Matsumoto Yushi Corporation, Japan) |

Synthesis of Endcappers

The individual silane endcappers E1 to E11 for the synthesis of some exemplary silane-functional polymers P were prepared by reacting various types of aminosilanes with Michael acceptors as detailed in Table 2. The amounts given are molar ratios in the reaction of the aminosilane with the respective Michael acceptor. The column "Reaction conditions" shows the reaction time and temperature conditions of the solventless reactions. In the case of E4, the endcapper is an isocyanato-functional silane.

TABLE 2

Synthesis details of the endcappers used for subsequent silane-functionalisation of some exemplary polymers.

| | Silane | | Michael acceptor | | |
|---|---|---|---|---|---|
| Type | Chemical name | Amount (%) | Chemical name | Amount (%) | Reaction conditions |
| E1 | 3-Aminopropyl trimethoxysilane | 51 | Maleic acid methyl ester | 49 | 3 h RT |
| E3 | 3-Aminopropyl methyl dimethoxysilane | 4.87 | Maleic acid methyl ester | 51.3 | 3 h RT |
| E4 | 3-Isocyanatopropyl trimethoxysilane | 100 | — | — | |
| E5 | 3-Aminopropyl trimethoxysilane | 100 | — | — | |
| E6 | 3-Aminopropyl trimethoxysilane | 42.7 | Lauryl acrylate | 57.3 | 7 d 50° C., 7 d RT |
| E7 | N-Phenyl-3-Aminopropyl trimethoxysilane | 100 | — | — | |
| E8 | N-Aminoethyl-3-Aminopropyl trimethoxysilane | 54.5 | Maleic acid methyl ester | 45.5 | 12 h 60° C. |
| E10 | N-Aminoethyl-3-Aminopropyl methyl dimethoxysilane | 52.5 | Maleic acid methyl ester | 47.5 | 12 h 60° C. |
| E11 | 3-Aminopropyl methyl dimethoxysilane | 40.5 | Lauryl acrylate | 59.5 | 7 d 50° C. |

Synthesis of Polymers P 500 g of Preminol® S-4111 (low monol polyoxypropylene diol, OH-number 11.0 mg KOH/g, water content about 0.01% (w/w)), 17 g isophorone diisocyanate (IPDI) or 14.91 g toluene diisocyanate (TDI), 200 g of diisononylphthalate (DINP) and 0.08 g Bi-catalyst (Coscat 83) were mixed in a nitrogen atmosphere and heated up to 90° C. After 2 h mixing, NCO-content was determined by titration. After achieving the target NCO of 0.35%, the required amount of the respective endcapper (as listed in Table 2) was added. The mixture was then kept for another 4 h at 90° C., until no NCO could be detected by IR anymore. After cooling down to 70° C., 6 g vinyl trimethoxysilane (KBM-1003) was added to the mixture. The details of each polymer synthesis are given in Table 3.

TABLE 3

Synthesis details of the silane-functional polyurethane polymers.

| | Preminol S-4111 | Isocyanate | | Endcapper | | Viscosity |
|---|---|---|---|---|---|---|
| Polymer | Amount (g) | Type | Amount (g) | Type | Amount (g) | (Pa · s) |
| P1 | 500.0 | IPDI | 17.0 | E1 | 17.24 | 60 |
| P2 | Commercial MS Polymer S-810 (without added plasticizer) | | | | | 50 |
| P3 | 500.0 | IPDI | 17.0 | E3 | 16.45 | 86 |
| P4 | 500.0 | IPDI | 6.08 | E4 | 9.46 | 83 |
| P5 | 500.0 | IPDI | 17.0 | E5 | 9.45 | 91 |
| P6 | 500.0 | IPDI | 17.0 | E6 | 20.58 | 75 |
| P7 | 500.0 | IPDI | 17.0 | E7 | 13.56 | 98 |
| P8 | 500.0 | IPDI | 17.0 | E8 | 19.14 | 94 |
| P9 | 500.0 | TDI | 14.91 | E1 | 21.43 | 101 |
| P10 | 500.0 | IPDI | 17.0 | E10 | 18.55 | 61 |
| P11 | 500.00 | IPDI | 17.0 | E11 | 19.8 | 72 |

TABLE 4

Non-inventive reference examples for components A. All numbers in wt-% based on the total weight of component A.

| Component (wt-%) | C1-A | C2-A | C3-A |
|---|---|---|---|
| Polymer P1 | 32.5 | — | — |
| Polymer P2 | — | 25 | — |
| Polymer P3 | — | — | 32.5 |
| Hakuenka CCR-B | 30.0 | 30.0 | 30.0 |
| SB-UVA626 | 0.1 | 0.1 | 0.1 |
| Adeka Stab AO-50 | 0.1 | 0.1 | 0.1 |
| Special Rise Super SS | 15.0 | 15.0 | 15.0 |
| DINP | 19.3 | 26.8 | 19.3 |
| Microballoon MFL-60CA | 3.0 | 3.0 | 3.0 |

Preparation of Components A

The inventive components A all comprised polymer P and plasticizer as given above. For the reference examples, non-inventive components A were prepared according to the details given in Table 4.

TABLE 4-continued

Non-inventive reference examples for components A. All numbers in wt-% based on the total weight of component A.

| Component (wt-%) | C1-A | C2-A | C3-A |
|---|---|---|---|
| TOTAL | 100.0 | 100.0 | 100.0 |

For the compositions detailed in Table 4, all ingredients except the microballoons were mixed in a metal can on a lab mixer under vacuum at high speed for 10 min. After scrape down, the microballoons were added, and mixed for another 10 min at low speed under vacuum. The mixture was filled into cartridges.

Preparation of Components B

The inventive components B used in the examples are detailed in Table 5. For the reference examples, non-inventive components B were prepared according to the details given in Table 6.

TABLE 5

Inventive example components B. All numbers in wt-% based on the total weight of component B.

| Component (wt-%) | B1 | B2 | B3 |
|---|---|---|---|
| DINP | 41.6 | 40.7 | 41.9 |
| SB-UVA626 | 0.1 | 0.1 | 0.1 |
| Adeka Stab AO-50 | 0.1 | 0.1 | 0.1 |
| Hakuenka CCR-B | 36.0 | 36.0 | 36.0 |
| Special Rise Super SS | 18.0 | 18.0 | 18.0 |
| Neostann U-28 | 0.4 | 1.25 | 0.2 |
| Farmin 20D | 0.2 | 0.25 | 0.1 |
| Microballoon MFL-60CA | 3.6 | 3.6 | 3.6 |
| TOTAL | 100.0 | 100.0 | 100.0 |

For the compositions detailed in Table 5, all ingredients except the microballoons were mixed in a metal can on a lab mixer under vacuum at high speed for 10 min. After scrape down, the microballoons were added, and mixed for another 10 min at low speed under vacuum. The mixture was filled into cartridges.

TABLE 6

Non-inventive example components B. All numbers in wt-% based on the total weight of component B.

| Component (wt-%) | C1-B | C2-B | C3-B |
|---|---|---|---|
| DINP | 33.0 | 30.0 | 30.0 |
| Neostann U-28 | 5.0 | 10.0 | 10.0 |
| Farmin 20D | 2.0 | 2.0 | 2.0 |
| Special Rise Super SS | 60.0 | 58.0 | 58.0 |
| TOTAL | 100.0 | 100.0 | 100.0 |

For the compositions detailed in Table 6, all ingredients were mixed in a metal can on a lab mixer under vacuum at high speed for 10 min. After scrape down, the mixture was filled into cartridges. C2-B and C3-B are identical compositions.

Mixing of Components A and Components B

In all trials according to the present invention the mixing ratio was A:B=1:3 (w/w). For some non-inventive examples, the mixing ratio was A:B=10:1. The mixture of both components was obtained by first adding the smaller volume (normally component A) to the larger volume (normally component B). The mixture was then mixed for 10 minutes at low speed on a lab mixer under vacuum and directly used for sample preparation.

Test Results and Observations

The inventive and non-inventive two-component compositions were tested by several methods. The results are shown in the following tables. All inventive examples are named "I", while the non-inventive reference examples are named "C".

TABLE 7

Test results for inventive and reference two-component compositions.

| | | I1 | C1 | I2 | C2 | I3 | C3 |
|---|---|---|---|---|---|---|---|
| Polymer P type | | P1 | P1 | P2 | P2 | P3 | P3 |
| Component A | | P1 | C1-A | P2 | C2-A | P3 | C3-A |
| Component B | | B1 | C1-B | B2 | C2-B | B2 | C3-B |
| Mixing ratio A:B | (w/w) | 1:3 | 10:1 | 1:3 | 10:1 | 1:3 | 10:1 |
| Extrusion force | 1 d RT | 389 | 566 | 371 | 327 | 373 | 463 |
| (shelf life) | 7 d 60° C. | 395 | 849 | 382 | 426 | 385 | 617 |
| Penetration | 1 h | 427 | 257 | 428 | 353 | 428 | 297 |
| (0.1 mm) | 3 h | 381 | 219 | 112 | 70 | 367 | 124 |
| | 5 h | 212 | 61 | 40 | 40 | 243 | 47 |
| JIS 9030 (2000 cycles) | | Pass | Pass | Pass | Fail | Pass | Pass |
| Hardness Shore C, | 1 d | 29 | 30 | 23 | 28 | 0 | 27 |
| 23° C., 50% r.h. | 7 d | 36 | 43 | 23 | 28 | 2 | 28 |
| Test results (H-shape sample) 7 d RT + 7 d 50° C. | | | | | | | |
| E-modulus 0-100% | (MPa) | 0.22 | 0.30 | 0.12 | 0.18 | 0.05 | 0.16 |
| Tensile strength | (MPa) | 0.38 | 0.68 | 0.27 | 0.38 | 0.17 | 0.49 |
| Elongation | (%) | 440 | 572 | 824 | 751 | 1015 | 897 |
| Type of failure | | Cf100 | Cf100 | Cf95 | Cf100 | Cf95 | Cf50 |
| Test results (H-shape sample) 7 d RT + 14 d 90° C. | | | | | | | |
| E-modulus 0-100% | (MPa) | 0.26 | 0.30 | 0.16 | 0.17 | 0.06 | 0.17 |
| Tensile strength | (MPa) | 0.37 | 0.60 | 0.32 | 0.36 | 0.20 | 0.45 |
| Elongation | (%) | 389 | 564 | 550 | 550 | 449 | 871 |
| Type of failure | | Cf100 | Cf100 | Cf80 | Cf80 | Cf50 | Cf50 |

In Table 7, a comparison of three inventive compositions I1-I3 and three non-inventive reference compositions C1-03 is shown. Components A of the inventive compositions comprised essentially only polymer P, while the non-inventive compositions comprised filler as well in component A. The comparison of I1 and C1 shows that only the inventive example I1 has a good shelf life (storage stability), as the extrusion force increases only minimally after storage during 7 days at 60° C. The same is apparent when comparing I3 with C3. When comparing I2 with C2, this effect is less pronounced. However, C2 fails the JIS 9030 test. Only the inventive examples pass the JIS 9030 test and show only marginal increase in extrusion force.

TABLE 8

Test results for inventive and reference two-component compositions based on trifunctional polymers.

| | | Example | | | | | |
|---|---|---|---|---|---|---|---|
| | | I4 | C4 | C5 | C6 | C7 | C8 |
| Polymer P type | | P4 | P5 | P6 | P7 | P8 | P9 |
| Component A | | P4 | P5 | P6 | P7 | P8 | P9 |
| Component B | | B1 | B1 | B1 | B1 | B1 | B1 |
| Mixing ratio A:B | (w/w) | 1:3 | 1:3 | 1:3 | 1:3 | 1:3 | 1:3 |
| Penetration | 1 h | 428 | 428 | 428 | 428 | 428 | 428 |
| (0.1 mm) | 3 h | 428 | 426 | 428 | 251 | 428 | 234 |
| | 5 h | 428 | 247 | 354 | 116 | 341 | 97 |
| JIS 9030 (2000 cycles) | | Pass | Fail | Fail | Fail | Fail | Fail |
| Hardness Shore | 1 d | 10 | 24 | 27 | 31 | 25 | 31 |
| C, 23° C., 50% r.h. | 7 d | 22 | 33 | 34 | 35 | 33 | 37 |
| Test results (H-shape sample) 7 d RT + 7 d 50° C. | | | | | | | |
| E-modulus 0-100% | (MPa) | 0.11 | 0.20 | 0.16 | n/c | 0.21 | 0.24 |
| Tensile strength | (MPa) | 0.23 | 0.37 | 0.36 | — | 0.36 | 0.35 |
| Elongation | (%) | 632 | 505 | 612 | — | 526 | 369 |
| Type of failure | | Cf40/Tf60 | Cf100 | Cf100 | — | Cf95 | Cf100 |
| Test results (H-shape sample) 7 d RT + 14 d 90° C. | | | | | | | |
| E-modulus 0-100% | (MPa) | 0.09 | 0.20 | 0.10 | 0.01 | 0.15 | 0.25 |
| Tensile strength | (MPa) | 0.21 | 0.35 | 0.30 | 0.05 | 0.32 | 0.33 |
| Elongation | (%) | 538 | 490 | 720 | 790 | 432 | 318 |
| Type of failure | | Cf90 | Cf100 | Tf10 | Cf95 | Cf95 | Cf95 |

Table 8 shows a comparison of compositions comprising another inventive polymer P (I4) and several non-inventive silane-functional polymers (C4-C8). All these polymers have trifunctional silane groups. As all other composition parameters apart from the polymer type are the same, this comparison shows the surprising effect of the polymer type on the durability test. Only inventive example I4 in this series passed the durability test according to JIS 9030. Reference example C6 did not even cure properly and therefore yielded poor mechanical test results.

TABLE 9

Test results for inventive and reference two-component compositions based on difunctional polymers.

| | | Example | | | |
|---|---|---|---|---|---|
| | | I5 | I6 | C9 | C10 |
| Polymer P type | | P2 | P3 | P10 | P11 |
| Component A | | P2 | P3 | P10 | P11 |
| Component B | | B2 | B2 | B2 | B2 |
| Mixing ratio A:B | (w/w) | 1:3 | 1:3 | 1:3 | 1:3 |
| Penetration | 1 h | 428 | 428 | 283 | 428 |
| (0.1 mm) | 3 h | 112 | 367 | 33 | 422 |
| | 5 h | 40 | 243 | 17 | 245 |
| JIS 9030 (2000 cycles) | | Pass | Pass | Fail | Fail |
| Hardness Shore C, | 1 d | 23 | 0 | 33 | 33 |
| 23° C., 50% r.h. | 7 d | 23 | 2 | 43 | 36 |
| Test results (H-shape sample) 7 d RT + 7 d 50° C. | | | | | |
| E-modulus 0-100% | (MPa) | 0.12 | 0.05 | 0.19 | n/c |
| Tensile strength | (MPa) | 0.27 | 0.17 | 0.34 | — |
| Elongation | (%) | 824 | 1015 | 710 | — |
| Type of failure | | Cf95 | Cf95 | Cf85 | — |
| Test results (H-shape sample) 7 d RT + 14 d 90° C. | | | | | |
| E-modulus 0-100% | (MPa) | 0.16 | 0.06 | 0.08 | 0.14 |
| Tensile strength | (MPa) | 0.32 | 0.20 | 0.25 | 0.63 |
| Elongation | (%) | 633 | 449 | 476 | 633 |
| Type of failure | | Cf5/Tf95 | Cf85 | Cf50 | Cf5/Tf95 |

In Table 9, several compositions comprising silane-functional polymers with difunctional silane groups are compared. Also in this case, only inventive examples I5 and I6 pass the durability test according to JIS 9030, while the non-inventive examples C9 and C10 both fail. C10 furthermore did cure very slowly and the H-shape sample after 7 d RT and 7 d 50° C. could not be measured due to insufficient curing.

TABLE 10

Test results for inventive two-component compositions with varying catalyst concentration.

| | | Example | | | | | |
|---|---|---|---|---|---|---|---|
| | | I6 | I7 | I8 | I9 | I10 | I11 |
| Polymer P type | | P1 | P1 | P1 | P2 | P2 | P2 |
| Component A | | P1 | P1 | P1 | P2 | P2 | P2 |
| Component B | | B2 | B1 | B3 | B2 | B1 | B3 |
| Mixing ratio A:B | (w/w) | 1:3 | 1:3 | 1:3 | 1:3 | 1:3 | 1:3 |
| Penetration | 1 h | 428 | 427 | 427 | 428 | 428 | 428 |
| (0.1 mm) | 3 h | 428 | 381 | 100 | 428 | 428 | 112 |
| | 5 h | 428 | 212 | 38 | 428 | 372 | 40 |
| JIS 9030 (2000 cycles) | | Pass | Pass | Pass | Pass | Pass | Pass |
| Hardness Shore | 1 d | 0 | 29 | 30 | n/c | 22 | 23 |
| C, 23° C., 50% r.h. | 7 d | 35 | 36 | 36 | n/c | 25 | 23 |
| Test results (H-shape sample) 7 d RT + 7 d 50° C. | | | | | | | |
| E-modulus 0-100% | (MPa) | 0.24 | 0.22 | 0.18 | n/c | 0.15 | 0.12 |
| Tensile strength | (MPa) | 0.42 | 0.38 | 0.37 | — | 0.34 | 0.27 |
| Elongation | (%) | 356 | 440 | 520 | — | 823 | 824 |
| Type of failure | | Cf95/Tf5 | Cf100 | Cf100 | — | Cf55/Tf45 | Cf65/Tf30 |
| Test results (H-shape sample) 7 d RT + 14 d 90° C. | | | | | | | |
| E-modulus 0-100% | (MPa) | 0.27 | 0.26 | 0.24 | 0.18 | 0.12 | 0.16 |
| Tensile strength | (MPa) | 0.50 | 0.37 | 0.37 | 0.38 | 0.29 | 0.32 |
| Elongation | (%) | 395 | 389 | 491 | 656 | 772 | 550 |
| Type of failure | | Cf95/Tf5 | Cf100 | Cf90/Tf5 | Cf90/Tf10 | Cf90/Tf5 | Cf80/Tf15 |

The results of Table 10 show how inventive compositions with varying catalyst concentration perform. While polymer P2 in composition I9 did struggle with low catalyst concentration and cured very slowly, all samples eventually passed the durability test according to JIS 9030. These results show that the inventive compositions possess an excellent durability in cured state and robust performance over a wide range of catalyst concentration.

TABLE 11a

Inventive and non-inventive example compositions comprising diaminosilane to improve adhesion properties. The values are in wt.-% based on the total weight of the respective component A or B.

| | Example | | | | | |
|---|---|---|---|---|---|---|
| | I12 | C11 | C12 | I13 | C13 | C14 |
| Mixing ratio A:B (w/w) | 1:3 | 10:1 | 10:1 | 1:3 | 10:1 | 10:1 |
| Component A | | | | | | |
| Polymer P1 | 96.0 | 32.5 | 32.5 | — | — | — |
| Polymer P2 | — | — | — | 96.0 | 25.0 | 25.0 |
| Polymer P3 | — | — | — | — | — | — |
| Hakuenka CCR-B | — | 30.0 | 30.0 | — | 30.0 | 30.0 |
| SB-UVA626 | — | 0.1 | 0.1 | — | 0.1 | 0.1 |
| Adeka Stab AO-50 | — | 0.1 | 0.1 | — | 0.1 | 0.1 |
| Special Rise Super SS | — | 15.0 | 15.0 | — | 15.0 | 15.0 |
| DINP | — | 18.3 | 19.3 | — | 25.8 | 26.8 |
| Microballoon MFL-60CA | — | 3.0 | 3.0 | — | 3.0 | 3.0 |
| Diaminosilane KBM 603 | 4.0 | 1.0 | — | 4.0 | 1.0 | — |
| TOTAL Component A | 100.0 | 100 | 100 | 100.0 | 100 | 100 |
| Component B | | | | | | |
| DINP | 41.76 | 38.7 | 28.7 | 40.91 | 32.0 | 22.0 |
| SB-UVA626 | 0.12 | — | — | 0.12 | — | — |
| Adeka Stab AO-50 | 0.12 | — | — | 0.12 | — | — |
| Hakuenka CCR-B | 36.0 | — | — | 36.0 | — | — |
| Diaminosilane KBM 603 | — | — | 10.0 | — | — | 10.0 |
| Neostann U-28 | 0.4 | 3.3 | 3.3 | 1.25 | 10.0 | 10.0 |
| Special Rise Super SS | 18.0 | 58.0 | 58.0 | 18.0 | 58.0 | 58.0 |
| Microballoon MFL-60CA | 3.6 | — | — | 3.6 | — | — |

TABLE 11a-continued

Inventive and non-inventive example compositions comprising diaminosilane to improve adhesion properties. The values are in wt.-% based on the total weight of the respective component A or B.

| | Example | | | | | |
|---|---|---|---|---|---|---|
| | I12 | C11 | C12 | I13 | C13 | C14 |
| TOTAL Component B | 100 | 100 | 100 | 100 | 100 | 100 |

Table 11a and Table 11b list the composition details of some inventive (I12-I14) and non-inventive (C11-C16) two-component compositions comprising a diaminosilane for improved adhesion. Inventive compositions I12-I14 contain the diaminosilane in component A, along with only the polymer P. In non-inventive reference compositions C11, C13, and C15 the diaminosilan is also comprised in component A, however alongside with undried filler. In non-inventive compositions C12, C14, and C16, the diaminosilane is comprised in component B.

TABLE 11b

Inventive and non-inventive example compositions comprising diaminosilane to improve adhesion properties. The values are in wt.-% based on the total weight of the respective component A or B.

| | Example | | |
|---|---|---|---|
| | I14 | C15 | C16 |
| Mixing ratio A:B (w/w) | 1:3 | 10:1 | 10:1 |
| Component A | | | |
| Polymer P1 | — | — | — |
| Polymer P2 | — | — | — |
| Polymer P3 | 96.0 | 32.5 | 32.5 |
| Hakuenka CCR-B | — | 30.0 | 30.0 |
| SB-UVA626 | — | 0.1 | 0.1 |
| Adeka Stab AO-50 | — | 0.1 | 0.1 |
| Special Rise Super SS | — | 15.0 | 15.0 |

TABLE 11b-continued

Inventive and non-inventive example compositions comprising diaminosilane to improve adhesion properties. The values are in wt.-% based on the total weight of the respective component A or B.

| | Example | | |
|---|---|---|---|
| | I14 | C15 | C16 |
| DINP | — | 18.3 | 19.3 |
| Microballoon MFL-60CA | — | 3.0 | 3.0 |
| Diaminosilane KBM 603 | 4.0 | 1.0 | — |
| TOTAL Component A | 100.0 | 100 | 100 |
| Component B | | | |
| DINP | 40.16 | 28.0 | 18.0 |
| SB-UVA626 | 0.12 | — | — |
| Adeka Stab AO-50 | 0.12 | — | — |
| Hakuenka CCR-B | 36.0 | — | — |
| Diaminosilane KBM 603 | — | — | 10.0 |
| Neostann U-28 | 2.0 | 14.0 | 14.0 |
| Special Rise Super SS | 18.0 | 58.0 | 58.0 |
| Microballoon MFL-60CA | 3.6 | — | — |
| TOTAL Component B | 100 | 100 | 100 |

The two-component compositions I12-I14 and C11-C16 were tested for their adhesion properties using a bead adhesion test. Each two component composition was first aged during 7 days at 60° C. in its closed container. After this treatment, some components showed deterioration. For adhesion testing, the thermally aged components A and B of each two-component composition were mixed together, if still possible, and applied on various substrates. The substrates were partially cleaned with isopropyl alcohol and in case of mortar substrate. The test results are shown in Tables 12a, 12b, and 12c, alongside with other mechanical test results of each thermally aged composition. For each two-component composition, two adhesion tests series were performed. The first series tested the adhesion after 14 days storage at RT and 50% r.h., while the second series tested the adhesion after 7 d water immersion (denoted "H$_2$O"). The adhesion was evaluated according to the following codes:

"1" >95% cohesive failure

"2" 75-95% cohesive failure

"3" 25-75% cohesive failure

"4" <25% cohesive failure, while the rest to 100% describes the amount of undesired adhesive failure.

TABLE 12a

Test results of some inventive and non-inventive compositions that were pre-aged thermally.

| | Example | | | | | |
|---|---|---|---|---|---|---|
| | I12 | | C11 | | C12 | |
| | Shelf life (storage 7 d 60° C.) observations | | | | | |
| | OK (no significant changes) | | Component A cured | | Component B: Strongly separated/yellow | |
| | Adhesion after treatment | | | | | |
| | 14 d RT | 7 d H$_2$O | 14 d RT | 7 d H$_2$O | 14 d RT | 7 d H$_2$O |
| Al elox. | 1 | 1 | — | — | 1 | 1 |
| Al elox. with SA | 1 | 1 | — | — | 2 | 1 |
| Aluminum | 1 | 1 | — | — | 4 | 4 |
| Aluminum with SA | 1 | 1 | — | — | 2 | 2 |
| Stainless steel | 1 | 1 | — | — | 2 | 1 |
| Stainless steel with SA | 1 | 1 | — | — | 3 | 2 |
| Glass | 1 | 1 | — | — | 2 | 1 |
| Glass with SA | 1 | 3 | — | — | 2 | 1 |
| Mortar without pretreatment | 1 | 4 | — | — | 2 | 4 |
| Mortar with Sika Primer 3N | 1 | 1 | — | — | 1 | 2 |
| Mechanical test results | | | | | | |
| Shore C (7 d 23° C., 50% r.h.)* | 26 | | — | | 26 | |
| Shore C (14 d 23° C., 50% r.h.) | 37 | | — | | 38 | |
| Tensile strength (MPa)** | 1.01 | | — | | 0.88 | |
| E-modulus 0-100% (MPa)** | 0.28 | | — | | 0.75 | |
| Elongation at break (%)** | 451 | | — | | 198 | |

**The mechanical values apart from hardness were measured via dumbbell, not H-shaped samples (SA = Sika Activator).

*Sika Activator before application or pretreated with a primer

TABLE 12b

Test results of some inventive and non-inventive compositions that were pre-aged thermally.

| | Example | | | | | |
|---|---|---|---|---|---|---|
| | I13 | | C13 | | C14 | |
| | Shelf life (storage 7 d 60° C.) observations | | | | | |
| | OK (no changes) | | OK (no changes) | | Component B: Strongly separated/yellow | |
| | Adhesion after treatment | | | | | |
| | 14 d RT | 7 d H$_2$O | 14 d RT | 7 d H$_2$O | 14 d RT | 7 d H$_2$O |
| Al elox. without cleaner | 1 | 1 | 1 | 2 | 2 | 2 |
| Al elox. with cleaner | 1 | 1 | 4 | 4 | 2 | 1 |
| Aluminum without cleaner | 1 | 1 | 4 | 1 | 2 | 1 |
| Aluminum with cleaner | 1 | 1 | 4 | 4 | 2 | 2 |
| Stainless steel w/o cleaner | 1 | 1 | 3 | 3 | 4 | 4 |
| Stainless steel with cleaner | 2 | 1 | 2 | 1 | 4 | 3 |
| Glass without cleaner | 1 | 1 | 2 | 2 | 3 | 1 |
| Glass with cleaner | 1 | 3 | 2 | 2 | 3 | 3 |
| Mortar without pretreatment | 3 | 4 | 4 | 4 | 4 | 4 |
| Mortar with Primer 3N | 1 | 3 | 4 | 4 | 1 | 4 |
| | Mechanical test results | | | | | |
| Shore C (7 d 23° C., 50% r.h.) | 25 | | 36 | | 11 | |
| Shore C (14 d 23° C., 50% r.h.) | 28 | | 42 | | 37 | |
| Tensile strength (MPa)** | 0.92 | | 0.89 | | 0.60 | |
| E-modulus 0-100% (MPa)** | 0.16 | | 0.38 | | 0.38 | |
| Elongation at break (%)** | 937 | | 360 | | 295 | |

**The mechanical values apart from hardness were measured via dumbbell, not H-shaped samples.

TABLE 12c

Test results of some inventive and non-inventive compositions that were pre-aged thermally.

| | Example | | | | | |
|---|---|---|---|---|---|---|
| | I14 | | C15 | | C16 | |
| | Shelf life (storage 7 d 60° C.) observations | | | | | |
| | OK (no changes) | | Component A cured | | Component B: Strongly separated/yellow | |
| | Adhesion after treatment | | | | | |
| | 14 d RT | 7 d H$_2$O | 14 d RT | 7 d H$_2$O | 14 d RT | 7 d H$_2$O |
| Al elox. without cleaner | 1 | 1 | — | — | 1 | 3 |
| Al elox. with cleaner | 1 | 1 | — | — | 1 | 1 |
| Aluminum without cleaner | 3 | 4 | — | — | 2 | 3 |
| Aluminum with cleaner | 1 | 1 | — | — | 1 | 1 |
| Stainless steel w/o cleaner | 1 | 1 | — | — | 1 | 1 |
| Stainless steel with cleaner | 1 | 1 | — | — | 1 | 2 |
| Glass without cleaner | 1 | 1 | — | — | 1 | 1 |
| Glass with cleaner | 2 | 1 | — | — | 1 | 2 |
| Mortar without pretreatment | 4 | 4 | — | — | 1 | 3 |
| Mortar with Primer 3N | 1 | 4 | — | — | 1 | 4 |
| | Mechanical test results | | | | | |
| Shore C (7 d 23° C., 50% r.h.)* | 25 | | — | | 48 | |
| Shore C (14 d 23° C., 50% r.h.) | 33 | | — | | 47 | |
| Tensile strength (MPa)** | 1.32 | | — | | 0.95 | |
| E-modulus 0-100% (MPa)** | 0.26 | | — | | 0.60 | |
| Elongation at break (%)** | 717 | | — | | 450 | |

**The mechanical values apart from hardness were measured via dumbbell, not H-shaped samples.

The results in Tables 12a-12c show that the addition of a diaminosilane can significantly improve adhesion properties and allow for application without pretreatment of the substrates. All samples were subjected to a thermally simulated ageing process (7 d 60° C.). In the non-inventive examples were polymer P, diaminosilane, and filler were stored in the same component A, said component was cured after thermal ageing (C11 and C15) and could not be used anymore. In the examples where the diaminosilane was stored together with the catalyst and filler in component B, said components were not homogeneous anymore after thermal ageing and showed strong phase separation and yellowing, as well as increased viscosity.

Only the inventive compositions I12-I14 showed no apparent change after thermal ageing in their respective components A and B.

The adhesion results in the inventive examples are generally better compared to the non-inventive examples. Furthermore, their mechanical properties (such as hardness and E-modulus) are very similar to the comparable inventive examples without diaminosilane. This shows that the inventive two-component compositions can in some embodiments be formulated with improved adhesion properties, but without compromising their storage stability (shelf life) or mechanical properties.

The invention claimed is:

1. Two-component composition comprising
    a) a first component A, comprising
        between 50% and 100% by weight of at least one silane-functional polymer P selected from formula (II), and/or (III)

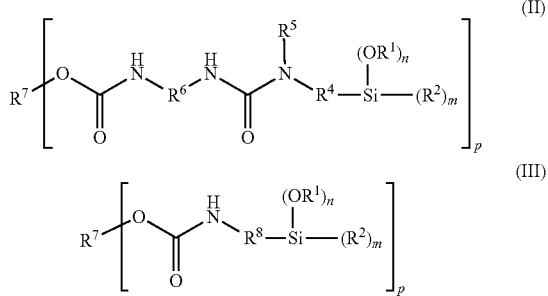

wherein
        radicals $R^1$ and $R^2$ independently represent a linear or branched monovalent hydrocarbon radical having 1 to 10 carbon atoms;
        radical $R^4$ represents a linear or branched divalent hydrocarbon radical having 1 to 6 carbon atoms and optionally containing one or more heteroatoms;
        radical $R^5$ represents a dialkyl succinate radical;
        radical $R^6$ represents a divalent aliphatic hydrocarbon radical having 1 to 15 carbon atoms;
        radical $R^7$ represents a hydroxyl-terminated polyether or polyurethane polymer after removal of p hydroxyl groups;
        radical $R^8$ represents a divalent linear, branched, or cyclic hydrocarbon radical having 1 to 15 carbon atoms and optionally containing heteroatoms;
        n represents an integer having a value of 2 or 3;
        m represents an integer having a value of 3-n;
        p represents an integer having a value of at least 2; and
        between 0% and 50% by weight of at least one plasticizer; and between 0% and 10% by weight of at least one organosilane OS; and between 0% and 5% by weight of at least one drying agent;
        wherein component A does not contain filler and component A is essentially free of catalyst for catalyzing hydrolysis and/or condensation of organosilanes and wherein the amounts of all individual components comprised in component A are adjusted such that their sum equals 100%;
    and
    b) a second component B, comprising
        between 0.05% and 4% by weight of a catalyst for catalyzing hydrolysis and/or condensation of organosilanes; and
        between 25% and 75% by weight of at least one filler; and
        between 0% and 60% by weight of at least one plasticizer; and
        between 0% and 0.5% of at least one stabilizer;
        wherein the amounts of all individual components comprised in component B are adjusted such that their sum equals 100%;
    wherein the mixing ratio by weight of component A to component B is between 1:2 and 1:4, and
    wherein the two components A and B are produced separately, stored in separated packages, and combined only immediately before application.

2. The two-component composition according to claim 1, wherein said radical $R^6$ represents an isophorone diisocyanate radical after removal of two isocyanate groups.

3. The two-component composition according to claim 1, wherein said radical $R^1$ represents a methyl or ethyl radical.

4. The two-component composition according to claim 1, wherein said radical $R^5$ represents a diethyl succinate radical.

5. The two-component composition according to claim 1, wherein the cured composition of the two components A and B passes the durability test according to Japanese Industrial Standard JIS A 5758:2010 and reaches classification 9030.

6. The two-component composition according to claim 1, wherein component A comprises between 50% and 100% by weight, based on the total weight of component A, of at least one polymer P, and between 0% and 50% by weight, based on the total weight of component A, of at least one plasticizer, and between 1% and 5% by weight, based on the total weight of component A, of at least one organosilane OS, wherein the amounts of all individual components comprised in component A are adjusted such that their sum equals 100%.

7. The two-component composition according to claim 1, wherein component B comprises between 25% and 75% by weight, based on the total weight of component B, of at least one filler, and between 0.05% and 4% by weight, based on the total weight of component B, of at least one catalyst for catalyzing hydrolysis and/or condensation of organosilanes, and between 15% and 50% by weight, based on the total weight of component B, of at least one plasticizer, and between 0% and 0.4% by weight, based on the total weight of component B, of at least one stabilizer, wherein the amounts of all individual components comprised in component B are adjusted such that their sum equals 100%.

8. The two-component composition according to claim 1, wherein said catalyst for catalyzing hydrolysis and/or condensation of organosilanes comprises a metal salt or complex, and an aliphatic, cycloaliphatic, or aromatic compound comprising at least one amine functional group.

9. The two-component composition according to claim 1, wherein said organosilane OS comprises at least one vinylsilane and/or at least one aminosilane and/or at least one mercaptosilane and/or at least one glycidoxysilane and/or mixtures thereof and/or oligomeric products thereof.

10. The two-component composition according to claim 1, wherein component B additionally comprises water.

11. A method comprising sealing, adhering, or coating with a two-component composition according to claim 1.

12. The method according to claim 11, wherein a substrate to be sealed, adhesively attached to another substrate, or coated was not pretreated with a primer or adhesion promoter.

13. A cured or curing composition obtained by combining component A and component B of the two-component composition according to claim 1 and mixing them by using a static or dynamic mixing system and applying the mixture to a substrate.

14. The two-component composition according to claim 1, wherein at least one silane-functional polymer P of formula (II) is present.

15. The two-component composition according to claim 1, wherein at least one silane-functional polymer P of formula (III) is present.

* * * * *